(12) United States Patent
Kanai

(10) Patent No.: US 8,532,296 B2
(45) Date of Patent: *Sep. 10, 2013

(54) PROCESSOR, MEMORY DEVICE, COMPUTER SYSTEM, AND METHOD FOR TRANSFERRING DATA

(75) Inventor: Tatsunori Kanai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1518 days.

This patent is subject to a terminal disclaimer.

(21) Appl. No.: 12/068,814

(22) Filed: Feb. 12, 2008

(65) Prior Publication Data

US 2008/0168279 A1 Jul. 10, 2008

Related U.S. Application Data

(62) Division of application No. 11/349,214, filed on Feb. 8, 2006, now Pat. No. 7,444,480.

(30) Foreign Application Priority Data

Mar. 29, 2005 (JP) ................................. 2005-096356

(51) Int. Cl.
*G06F 21/00* (2013.01)

(52) U.S. Cl.
USPC .......................................... 380/255; 380/264

(58) Field of Classification Search
USPC .................................. 713/190; 380/255, 264
See application file for complete search history.

(56) References Cited

U.S. PATENT DOCUMENTS

| 2001/0054163 | A1* | 12/2001 | Teglia | 714/702 |
| 2002/0146019 | A1* | 10/2002 | Malzahn | 370/402 |
| 2003/0156603 | A1* | 8/2003 | Rakib et al. | 370/485 |
| 2005/0108498 | A1 | 5/2005 | Kaminaga et al. | |

FOREIGN PATENT DOCUMENTS

| JP | 63-152241 | 6/1988 |
| JP | 3-99346 | 4/1991 |
| JP | 3-263147 | 11/1991 |
| JP | 9-259044 | 10/1997 |
| JP | 11-203237 | 7/1999 |
| JP | 2000-76144 | 3/2000 |
| JP | 2001-195555 | 7/2001 |
| JP | 2002-32268 | 1/2002 |
| JP | 2003-296104 | 10/2003 |
| JP | 2003-298569 | 10/2003 |
| JP | 2004-361986 | 12/2004 |

OTHER PUBLICATIONS

Office Action issued by the Japanese Patent Office on Aug. 4, 2009, for Japanese Patent Application No. 2005-096356, and Partial English Translation.

* cited by examiner

*Primary Examiner* — Edward Zee
*Assistant Examiner* — Chi Nguy
(74) *Attorney, Agent, or Firm* — Finnegan, Henderson, Farabow, Garrett & Dunner, L.L.P.

(57) ABSTRACT

A processor connected to a memory device includes a random number generator that generates random numbers identical to random numbers generated in the memory device; an XOR logic unit that performs a XOR operation of the random numbers and an address in the memory device to be accessed; and an after-operation-address sending unit that sends an after-operation-address indicating a result of the XOR operation.

3 Claims, 5 Drawing Sheets

PROCESSOR, MEMORY DEVICE, COMPUTER SYSTEM, AND METHOD FOR TRANSFERRING DATA

CROSS-REFERENCE TO RELATED APPLICATIONS

This application is a divisional of application Ser. No. 11/349,214, filed Feb. 8, 2006, which claims the benefit of priority from the prior Japanese Patent Application No. 2005-096356, filed on Mar. 29, 2005; all of which are incorporated herein by reference.

BACKGROUND OF THE INVENTION

1. Field of the Invention

This invention relates to a processor, a memory for storing data utilized by the processor, a computer system including the processor and the memory, and a method for transferring the data in the computer system.

2. Description of the Related Art

Computers are incorporated in many products such as digital cameras, digital televisions, DVD players, DVD/HDD recorders, game machines, cellular phones, portable audio players, control units for vehicles, and the like. Such devices and systems, in which the computers are incorporated, process copyright protected contents. The devices and systems also deal with important information such as private information and accounting information.

Wrongful activities, which include unauthorized copy of contents after decryption, and acquisition of private information and interpolation of accounting information as running an unauthorized program, have become problems for the devices and the systems.

As a method for preventing the illegal acquisition of the data (including programs) by observing signals on bus connecting the processor and the memory, for example, Japanese Patent Application Laid-Open No. 2003-298569 discloses that the processor encrypts as writing data in the memory and processes, after reading the encrypted data from the memory, decrypts and processes. As such, since the encrypted data only flows in the bus connecting the processor and the memory, reading of the data is not possible without knowledge of a key for decrypting.

However, use of strong encryption, for example public key encryption, when encrypting the data, becomes necessary so as to prevent third party's cryptanalysis. Yet, such strong encryption requires higher processing cost for encrypting and decrypting and becomes an obstacle for an increase of the processing speed.

SUMMARY OF THE INVENTION

According to one aspect of the present invention, a processor connected to a memory device includes a random number generator that generates random numbers identical to random numbers generated in the memory device; an XOR logic unit that performs a XOR operation of the random numbers and an address in the memory device to be accessed; and an after-operation-address sending unit that sends an after-operation-address indicating a result of the XOR operation.

According to another aspect of the present invention, a memory device for storing data utilized by a processor includes an after-operation-address obtaining unit that obtains, from the processor, an after-operation-address indicating a result of an XOR operation of an address in the memory device to be accessed by the processor and random numbers generated by the processor; a random number generator that generates random numbers identical to random numbers generated by the processor; an XOR logic unit that specifies the address of the data by performing the XOR operation of the after-operation-address and the random numbers generated by the random number generator; and a control unit that allows an access to an specified address.

According to still another aspect of the present invention, a computer system includes a processor that performs an operation; and a memory device that stores data utilized by the processor. The processor includes a random number generator that generates random numbers identical to random numbers generated in the memory device; a first XOR logic unit that performs an XOR operation of the random numbers and an address in the memory-device to be accessed; and an after-operation-address sending unit that sends an after-operation-address indicating a result of the XOR operation. The memory device includes an after-operation-address obtaining unit that obtains the after-operation-address from the processor; a random number generator that generates random numbers identical to the random numbers generated in the processor; a second XOR logic unit that determines an address in the memory device to be accessed by performing an XOR operation of the after-operation-address obtained by the after-operation-address obtaining unit and the random numbers generated by the random number generator of the memory device; and a control unit that allows an access to the specified address.

According to still another aspect of the present invention, a method for transferring data between a processor and a memory device for storing data utilized by the operating processor, includes generating random numbers identical to random numbers generated in the memory device by the processor; performing, by the processor, an XOR operation of the generated random numbers and an address in the memory device to be accessed by the processor; sending an after-operation-address indicating a result of the operation; obtaining the after-operation-address from the processor by the memory device; generating random numbers which are identical to random numbers generated by the processor, by the memory device; determining an address to be accessed by the memory device as performing the XOR operation of the after-operation-address and the random number generated by the memory device; and allowing an access to the address specified by the memory device.

DETAILED DESCRIPTION OF THE PREFERRED EMBODIMENTS

Exemplary embodiments of the processor, memory device, computer system and the method to transfer data according to the invention will be explained in detail with reference to the accompanying drawings. However, the invention is not limited to these embodiments.

Figure 1:
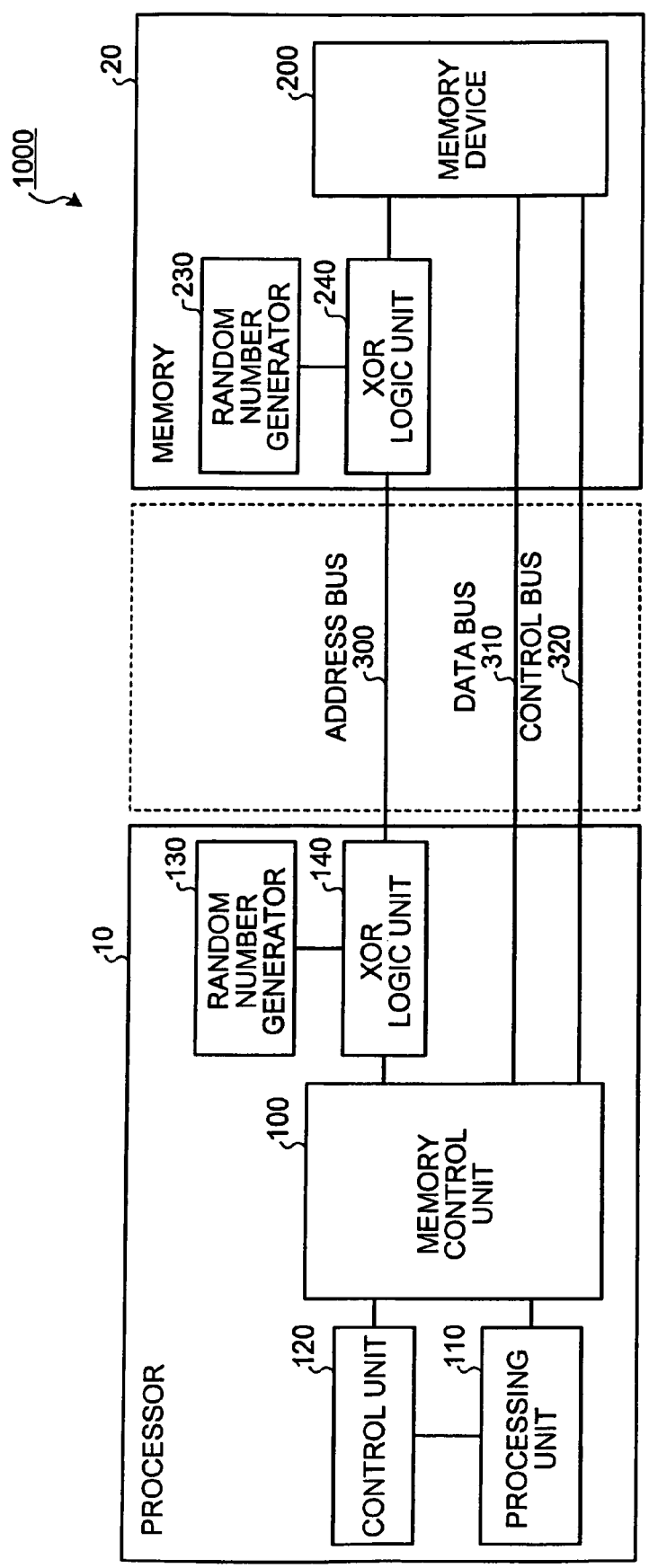
FIG. 1 is a block diagram showing the entire structure of a computer system according to a first embodiment of the invention.

FIG. 1 is a block diagram showing the entire structure of a computer system 1000 according to a first embodiment of the invention. The computer system 1000 includes a processor 10 and a memory 20. The processor 10 includes a memory control unit 100, a processing unit 110, a control unit 120, a random number generator 130, and an Exclusive-OR (XOR) logic unit 140. The memory 120 includes a memory del vice 200, a random number generator 230, and an XOR logic unit 240. The processor 10 and the memory 20 are connected each other via buses.

As the buses, there are an address bus 300, a data bus 310, and a control bus 320. Address signals, which specify the storage cell, flows in the address bus 300. Data signals in correspondence to the specified address flow in the data bus 310. Control signals, which specify to read and write, flow in the control bus 320.

The memory control unit 100 of the processor 10 reads the data from the memory 20 and writes the data in the memory 20. The processing unit 110 has a register for temporary storing the data. The processing unit 110 obtains the data from the memory 20 via the memory control unit 100 and process the data using the register. The control unit 120 manages program running in the processing unit 110.

The random number generator 130 generates a random number sequence determined based on a seed, i.e., an initial value. The random number generator 130 according to this embodiment generates the random number with the same bit length as the address. Concretely, a linear feedback shift register (LFSR) is used as the random number generator 130.

The XOR logic unit 140 performs the XOR operation of the random numbers generated by the random number-generator 130 and the address obtained via the memory control unit 100. That is, the XOR operation with the address to be output on the address bus 300 is performed.

The XOR logic unit 140 may be referred to as an after-operation-address sending unit.

The memory device 200 of the memory 20 stores such as data utilized by the processing unit 110. The random number generator 230 generates the random number sequence determined based on the seed set as in the random number generator 130. The XOR logic unit 240 performs the XOR operation od the random number generated by the random number generator 230 and the after-operation-address received from the processor 10, like the XOR logic unit 140. The random number generator 130 and the random number generator 230 generate the random number sequences corresponding to the same seed.

The XOR logic unit 240 may be also referred to as the after-operation-address obtaining unit.

For example, when sending the address "A" from the processor 10 to the memory 20 via the address bus 300, the XOR logic unit 140 performs the XOR operation of the subject address "A" and the random number "B" and gets the value "C." Then, this XOR value "C" is sent to the memory 20 via the address bus 300.

The memory 20 receives this XOR value "C." Then, XOR logic unit 240 performs the XOR operation of the received value "C" and the random number "B" generated by the random number generator 230. The random number generator 130 and the random number generator 230 generate identical random numbers. Accordingly, the value obtained upon the operation of the XOR logic unit 240 is the address "A."

Then, the read/write process specified by the control signal is operated relative to the data specified by the address "A" obtained in the memory device 200.

As such, a signal indicating the XOR value "C" only flows in the address bus 300, which prevents third parties with a wrongful intent from determining the true address even if they read the address flowing in the address bus 300.

In consideration of improvement in security, the random number generator 130 and the random number generator 230 preferably generate new random numbers whenever accessing the memory 20 from the processor 10. At this time, the random numbers simultaneously generated by the random number generator 130 and the random number generator 230 are identical random numbers.

As such, by encrypting the address, even if the data is obtained through monitoring the data bus 310, corresponding address cannot be determined and therefore the memory contents cannot be reproduced.

Also, a value of the data used in the computer is zero frequently while the address rarely is zero. For a memory such as DRAM which specifies as dividing the address in higher-order and lower-order addresses, for example, when accessing while the address is being incremented, the higher-order addresses are interleaved with the lower-order addresses, which does not allow simple incrementing address sequence. Therefore, encryption of the address shows more strength against a cryptanalysis than encryption of data.

One embodiment of the invention is explained above; however, changes and modifications may be made to the above-embodiment.

As a first modification, when the random number generator 130 and the random number generator 230 share the seed, the processor 10 and the memory 20 safely need to share the same seed. Accordingly, for example, the processor 10 may determine the seed and encrypt the seed to transfer the same to the XOR logic unit 240 of the memory 20.

Conventional key encryption may be used as the encryption method at that time. Public key encryption may also be used. Rather than simply sharing the seed of the random numbers between the processor and the memory at a start time, changing of the random number generation sequence is preferred as changing to new seed during the operation.

As a second modification to this embodiment, this embodiment has been explained that the address flowing in the bus between the processor 10 and the memory 20 is encrypted; however, it is not limited thereto. For example, encryption is possible in the bus between a video processor or an input-output device and a memory or a processor.

Figure 2:
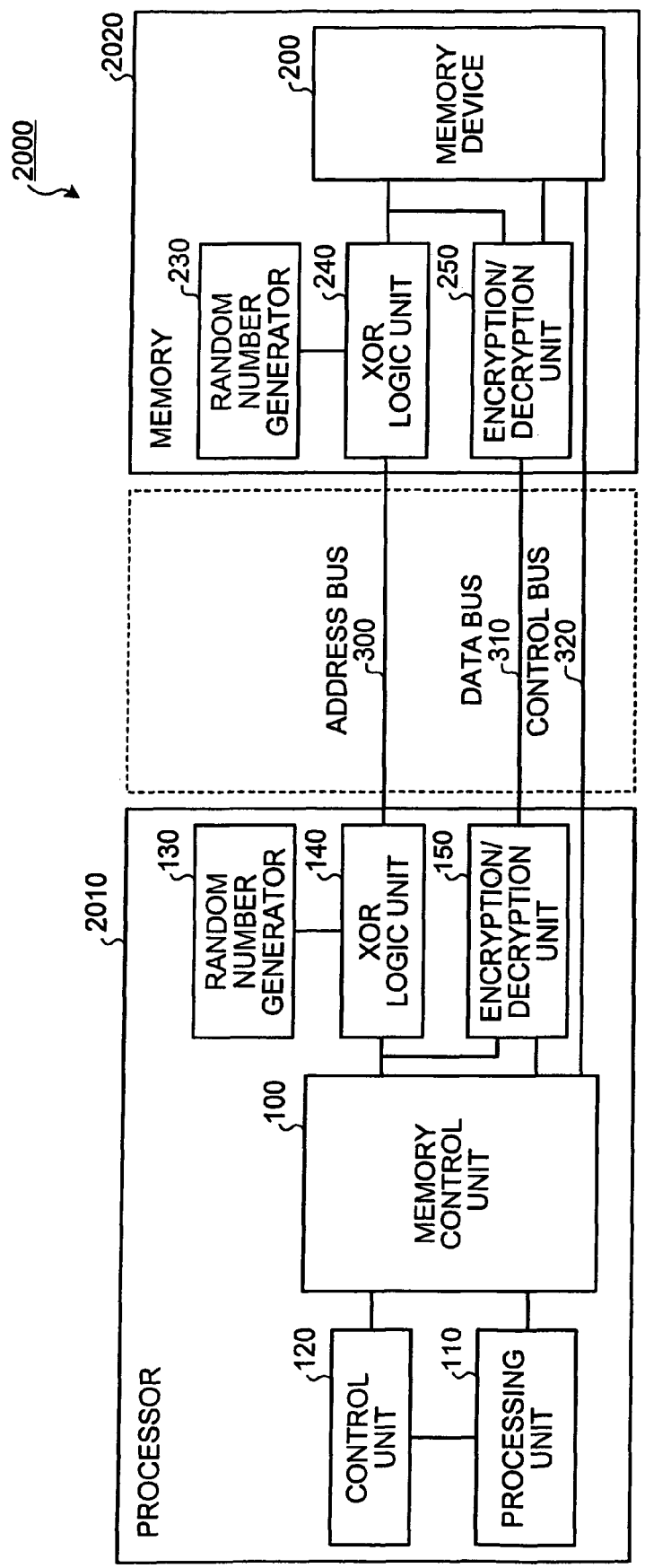
FIG. 2 is a block diagram showing the entire structure of a computer system according to a second embodiment of the invention.

FIG. 2 is a block diagram showing the entire structure of the computer system 2000 according to a second embodiment of the invention. A processor 2010 of the computer system 2000 according to the second embodiment, in addition to the components of the processor 10 according to the first embodiment of the invention, includes an encryption/decryption unit 150. Furthermore, a memory 2020 of the computer system 2000 according to the second embodiment, in addition to the components of the memory 20 according to the first embodiment, includes an encryption/decryption unit 250.

The encryption/decryption unit 150 encrypts data to be sent to the data bus 310 using the address or a portion thereof prior to the XOR logic unit 140 performing the XOR operation. The encryption/decryption unit 250 decrypts using the address or a portion thereof as a key determined by the XOR logic unit 240. The conventional key encryption method is used for encryption and decryption.

As such, the value of the XOR operation instead of the value of the address is sent to the address bus 300 in the computer system 2000 according to the second embodiment. That is, the address is encrypted to be sent. Accordingly, monitoring the address bus 300 cannot determine the value of the address.

Concretely, when the processor 2010 writes the data in the memory 2020, the encryption/decryption unit 150 encrypts the data and sends the encrypted data to the data bus 310. Then, the encryption/decryption unit 250 decrypts the encrypted data received via the data bus 310 using the address or a portion thereof obtained by the XOR logic unit 240.

Contrary to the above, when the processor 2010 reads the memory 2020, the encryption/decryption unit 250 encrypts the data and sends the encrypted data to the data bus 310. Then, the encryption/decryption unit 150 decrypts the encrypted data received via the data bus 310 using the address or a portion thereof.

As such, in addition to the transfer of the encrypted address to the address bus 300, further encrypting and sending of the data to the data bus 310 improves the security.

Other structures and processes of the computer system 2000 according to the second embodiment are the same as those of the computer system 1000 according to the first embodiment.

As another example, this embodiment uses the conventional key encryption method as the encryption method but it is not limited to the conventional key encryption and the public key encryption may be employed.

Figure 3:
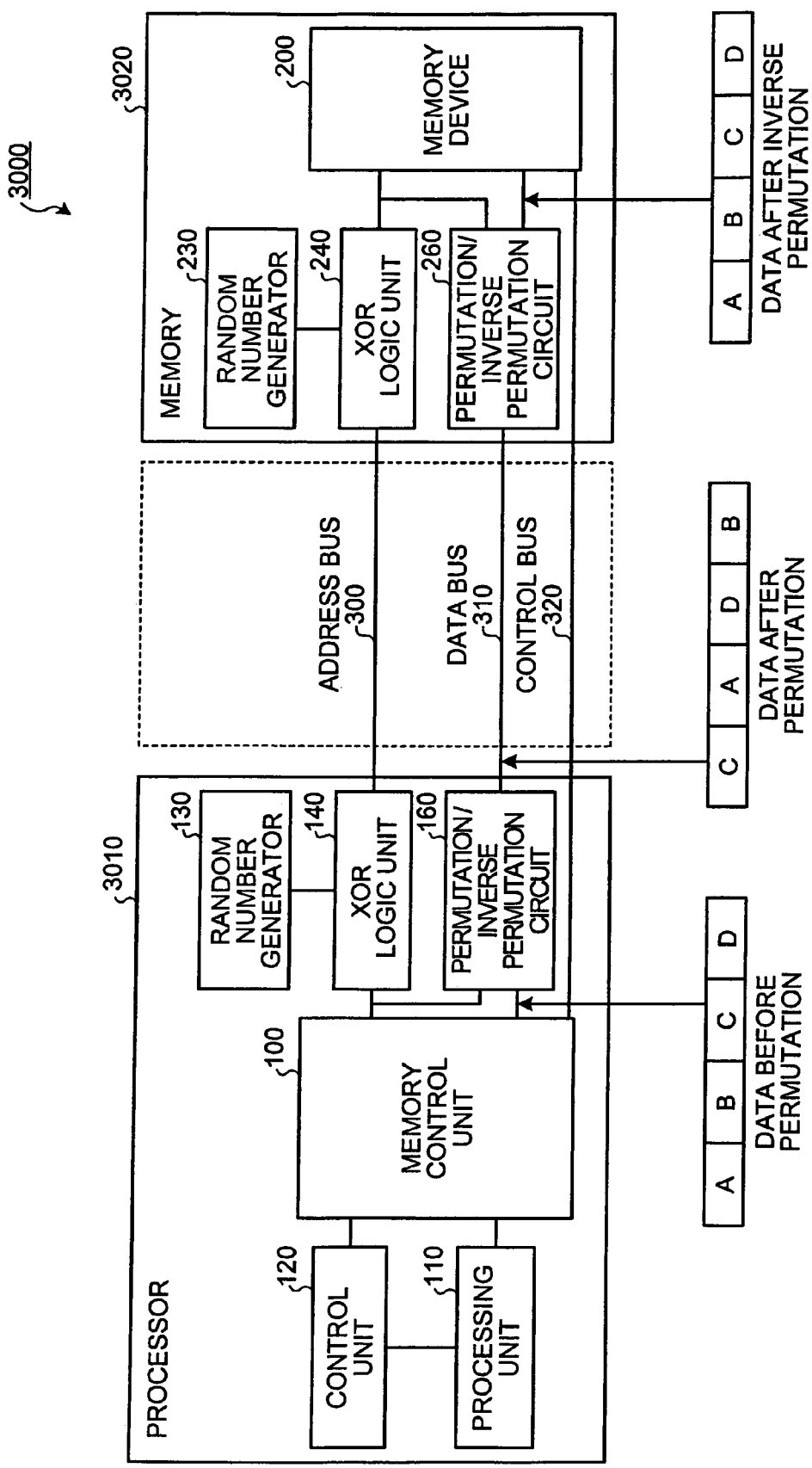
FIG. 3 is a block diagram showing the entire structure of a computer system according to a third embodiment of the invention.

FIG. 3 is a block diagram showing the entire structure of the computer system 3000 according to a third embodiment of the invention. A processor 3010 of the computer system 3000 according to the third embodiment has a permutation/inverse permutation circuit 160 instead of the encryption/decryption unit 150. In addition, a memory 3020 of the computer system 3000 has a permutation/inverse permutation circuit 260 instead of the encryption/decryption unit 250.

The computer system 3000 according to the third embodiment, the permutation/inverse permutation circuit 160 permutes per bit or word of data and also performs inverse permutation of the permuted data, i.e., returning the original order. The permutation/inverse permutation circuit 260 performs permutation or inverse permutation per bit or word of data as well.

For example, as shown in FIG. 3, when one word consisting of four bytes, "A," "B," "C," and "D" is to be written in a memory 3020, the permutation/inverse permutation circuit 160 permutes the order of four bytes. Concretely, positions are substituted per byte according to the method of permutation/inverse permutation due to the value of the address before the XOR operation. Also, more concretely, the permutation/inverse permutation circuit 160 stores a rule for determining the permutation method based on the address, and the method of permutation is determined based on the rule. The permutation/inverse permutation circuit 160, for example, may store an association table that associates the address and the permutation method.

In the example of FIG. 3, the permutation/inverse permutation circuit 160 permutes the order of "A," "B," "C," and "D" to "C," "A," "D," and "B." The data after the permutation is sent to the data bus 310.

The permutation/inverse permutation circuit 260 receives the data after the permutation from the data bus 310. Then, the inverse permutation is performed according to the permutation method set by the permutation method determined by the address obtained by the XOR logic unit 240, i.e., the permutation method same as the permutation method that permutation/inverse permutation circuit 160 permuted, thereby obtaining the data "A," "B," "C," and "D" before the permutation. The data is written in the memory 3020.

With respect to the third embodiment, the other structure and process in the computer system 3000 are the same as those of the computer system in the other embodiments.

As another example, in this embodiment, the data permutation is performed per unit of one word consisting of four bytes; however, the invention is not limited to this embodiment. For example, two words may be used as a unit to perform permutation of the data.

Figure 4:
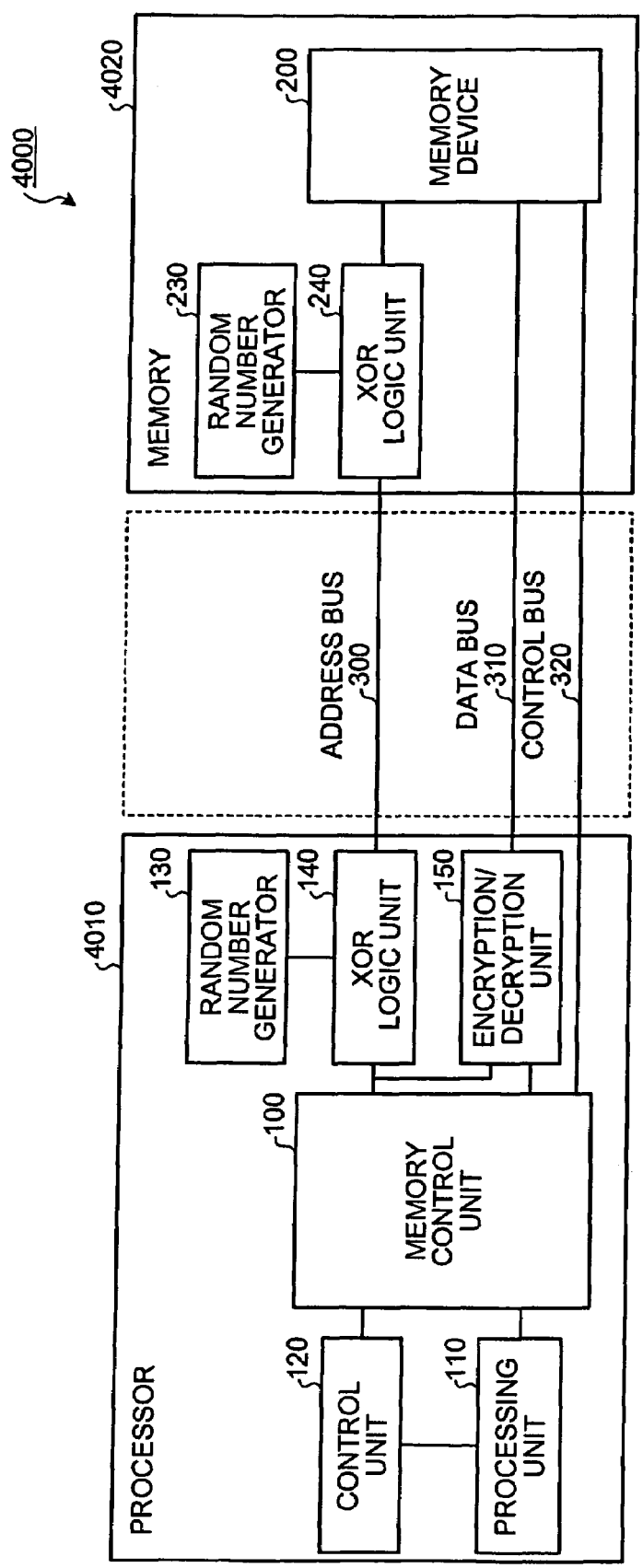
FIG. 4 is a block diagram showing the entire structure of a computer system according to a fourth embodiment of the invention.

FIG. 4 is a block diagram showing the entire structure of the computer system 4000 according to a fourth embodiment of the invention. The computer system 4000 according to the fourth embodiment of the invention is identical to the computer system 2000 according to the second embodiment except that the fourth embodiment does not have the encryption/decryption unit 250.

In the computer system 4000 according to the fourth embodiment, a processor 4010 sends the data encrypted by the encryption/decryption unit 150 to the data bus 310. Then, a memory 4020 records the encrypted data, which is received from the data bus 310, in the memory device 200 as the data being encrypted. When the processor 4010 reads the data, the encryption/decryption unit 150 of the processor 4010 decrypts again by the address used to encrypt.

As such, by recording the encrypted data in the memory device 200, when third parties with a wrongful intent cannot determine the data even if they try to read the data stored in the memory device 200, thereby improving the security.

The structure as explained in the fourth embodiment may be employed in the third embodiment.

A computer system according to a fifth embodiment will be explained next. The entire structure of the computer system according to the fifth embodiment is identical to that in the first embodiment explained with reference to FIG. 1. The computer system according to the fifth embodiment differs from the computer system 1000 of the first embodiment in the detailed structure and process of the memory control unit 100.

Figure 5:
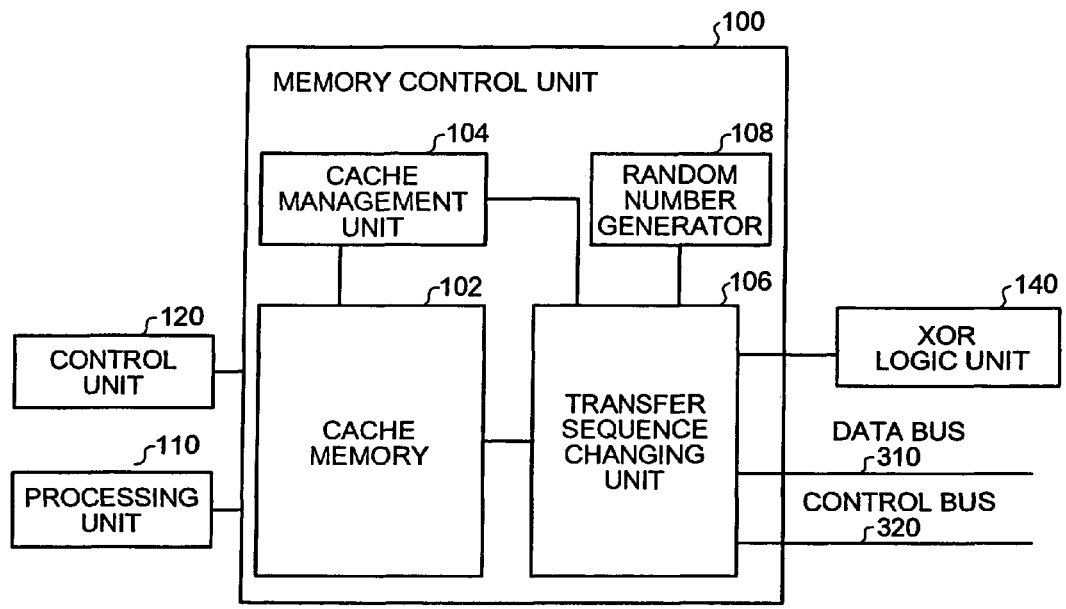
FIG. 5 is a block diagram showing the detailed functional structure of a memory control unit of a computer system according to a fifth embodiment of the invention.

FIG. 5 is a block diagram showing the details of the functional structure of the memory control unit 100 of the computer system according to fifth embodiment of the invention. The memory control unit 100 includes a cache memory 102, a cache management unit 104, a transfer sequence changing unit 106, and a random number generator 108.

The cache memory 102 stores data in a memory corresponding to one of the memories 20, 2020, 3020, and 4020 (hereinafter, referred to as "memory 20" as a representative of them). Data transfer between the cache memory 102 and the memory 20 is performed per unit, called cache line (e.g., four words or eight words in size). Generally, the size of the cache line is larger than the data size for reading/writing of the memory 20. Therefore, reading/writing of one cache line can be operated by reading/writing of the memory 20 relative to multiple continuous addresses.

The cache management unit 104 manages the cache memory 102 and also instruct to read from the memory or to write in the memory per cache line relative to the transfer sequence changing unit 106.

The transfer sequence changing unit 106 permutes the access order when continuously accessing the memory, based on the instruction of the cache management unit 104. That is, the transfer sequence changing unit 106 permutes the order of reading continuous data from the specified address in the memory 20 into the specified cache line. Alternatively, the transfer sequence changing unit 106 permutes the order of continuously writing the data of the specified cache line after the specified address in the memory 20.

More concretely, instead of accessing the specified address in continuous area on the memory in order, the access order is determined based on the random number generated by the random number generator 108. The transfer sequence changing unit 106 stores the rule for determination of the order based on the random number. The transfer sequence changing unit 106 determines the order based on the rule. The random number generator 108 generates the random number for the determination of the transfer order in the transfer sequence changing unit 106.

For example, even if the address of the memory bus is encrypted, reading/writing relative to the continuous address is performed while reading/writing the cache line. In the computer system according to this embodiment, while continuously accessing the memory such as when reading/writing the cache line, the memory access order is permuted, thereby preventing the third parties with a wrongful intention from guessing the access order.

Figure 6:
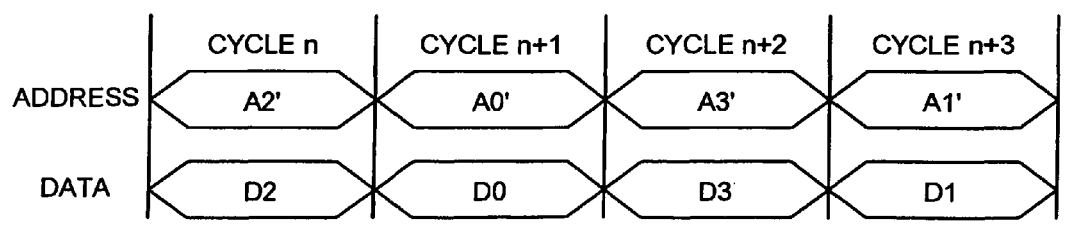
FIG. 6 is a diagram showing a typical bus operating condition during the data transfer between a cache line and a memory in the computer system according to the fifth embodiment of the invention.

FIG. 6 is a diagram showing an example of the bus operation during the data transfer between the cache line and the memory in the computer system according to the fifth embodiment of the invention. In the example shown in FIG. 6, the cache line is four times larger than the data width of the memory, and memory needs to be accessed four times for one cache line data transfer. Here, the data of four words of the cache line is transferred to the area of four words starting from the address A0.

FIG. 6 shows an example that the transfer sequence changing unit 106 determines the order of transfer, i.e., "A2," "A0," "A3," and "A1" respectively. At this time, "A2'" which is encrypted "A2," "A0'" which is encrypted "A0," "A3'" which is encrypted "A3," and "A1'" which is encrypted "A1" respectively flow in this order on the address signal on the bus.

Furthermore, in the data bus 310, data flows in the order of "D2," "D0," "D3," and "D1." That is, "D2" is transferred in the cycle n, "D0" is transferred in the cycle n+1, "D3" is transferred in the cycle n+2, and "D1" is transferred in the cycle n+3.

Here, in this embodiment, the memory control unit 100 of the fifth embodiment has the transfer sequence changing unit 106; however, the transfer sequence changing unit 106 may be provided in a device other than the memory control unit 100.

The transfer sequence changing unit 106 uses the signal indicating that the memory access is with one word or multiple words at the memory access to specify whether there is one word memory access or multiple words memory access. When it is multiple words memory access, the order of the memory access would be permuted to be sent to the data bus 310. On the other hand, if it is one word memory access, the order would be sent as it is to the data bus 310. Reading of the data can follow the same process. That is, if there is multiple words memory access, the data would be obtained in the permuted order.

In this embodiment, the transfer order is permuted based on the random number generated by the random number generator 108; however, information other than the random number can be used. For example, preset value may be loaded in the processor. Also, in consideration of the security, as explained in the embodiments, it is preferable that the random numbers are generated every time as transferring the data and the transfer order is changed based on the generated random numbers.

Also, although this embodiment explains the data transfer between the cache and memory, the data transfer is not limited to therebetween. For example, it can be used for a various continuous data transfer such as DMA (Direct Memory Access).

As described above, the processor, memory, computer system, and method for data transferring of the embodiments have advantages that the decrease of the processing speed and the wrongful activities such as the wrongful access to the computer are prevented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A processor connected to a memory device comprising:
   a random number generator that generates random numbers identical to random numbers generated in the memory device, the random numbers related to reproducing a specified address for access in the memory device;
   an XOR logic unit that performs an XOR operation of the random numbers generated by the random number generator and the specified address in the memory device to be accessed;
   an after-operation-address sending unit that sends an after-operation-address indicating a result of the XOR operation;
   a transfer sequence changing unit that stores a rule for determination of an access order based on the random numbers generated by the random number generator;
   a control unit that controls access to the specified address, wherein the access to the specified address is accessed according to the access order determined by the transfer sequence changing unit based on the rule;
   an encryption unit that encrypts data sent by the processor by using the specified address in the memory device for the data or a portion of the specified address as an encryption key; and
   an encrypted data sending unit that sends the encrypted data.

2. A memory device for storing data utilized by a processor, comprising:
   an after-operation-address obtaining unit that obtains, from the processor, an after-operation-address indicating a result of an XOR operation of a specified address of data in the memory device to be accessed by the processor and random numbers generated by the processor;
   a random number generator that generates random numbers identical to the random numbers generated by the processor, the random numbers related to reproducing the specified address of the data for access in the memory device;
   an XOR logic unit that determines the specified address of the data by performing the XOR operation of the after-operation-address and the random numbers generated by the random number generator;
   a control unit that allows access to the specified address of the data; and
   an encrypted data obtaining unit that, from the processor, obtains the encrypted data encrypted by using the specified address of the data or a portion of the specified address of the data as an encryption key, wherein the control unit stores the encrypted data in the specified address of the data.

3. The memory device according claim 2, further comprising:
a transfer sequence changing unit that stores a rule for determination of an access order based on the random numbers generated by the random number generator,
wherein the access to the specified address of the data is accessed according to the access order determined by the transfer sequence changing unit based on the rule.

* * * * *